United States Patent
Nakamura

(10) Patent No.: US 7,598,636 B2
(45) Date of Patent: Oct. 6, 2009

(54) AUTOMOTIVE ALTERNATOR WITH COOLING FAN HAVING PROJECTIONS FOR PREVENTING FOREIGN PARTICLES

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/076,639

(22) Filed: Mar. 20, 2008

(65) Prior Publication Data

US 2009/0039719 A1    Feb. 12, 2009

(30) Foreign Application Priority Data

Aug. 8, 2007  (JP) ............................. 2007-206012

(51) Int. Cl.
*H02K 9/06* (2006.01)
(52) U.S. Cl. .................... 310/62; 310/60 R; 310/63
(58) Field of Classification Search ............... 310/62, 310/67 R, 90, 60 R, 58, 63
See application file for complete search history.

(56) References Cited

U.S. PATENT DOCUMENTS 6,078,116 A * 6/2000 Shiga et al. ............... 310/60 R
7,015,606 B2 * 3/2006 Huang et al. ............... 310/63

FOREIGN PATENT DOCUMENTS

| JP | U-57-14654 | 6/1955 | | |
| JP | 363181637 A | * 7/1988 | .................. | 310/62 |
| JP | A-63-181637 | 7/1988 | | |
| JP | A-2005-151728 | 6/2005 | | |

OTHER PUBLICATIONS

Notice of Rejection in Japanese Application No. 2007-206012; Jun. 24, 2009.

* cited by examiner

*Primary Examiner*—Quyen Leung
*Assistant Examiner*—Leda Pham
(74) *Attorney, Agent, or Firm*—Oliff & Berridge, PLC

(57) ABSTRACT

An alternator of the present invention is mounted on an automotive vehicle to supply electric power to an on-board battery and electric loads. The alternator is composed of a housing, a stator fixedly held in the housing, a rotor rotatably supported in an inner bore of the stator, and other associated components. Alternating current generated in the stator is rectified into direct current and supplied to the on-board battery and electric loads. A cooling fan is connected to an axial end surface of the rotor. The cooling fan includes an annular portion extending in the axial direction to overlap with a bearing holder formed in the housing. A small annular gap is made between the annular portion and the bearing holder. Plural projections extending from the annular portion in the outer radial direction are formed integrally with the annular portion. Foreign particles are prevented from entering into the bearing by the annular portion having the projected portions.

5 Claims, 4 Drawing Sheets

FRONT SIDE ← → REAR SIDE

AUTOMOTIVE ALTERNATOR WITH COOLING FAN HAVING PROJECTIONS FOR PREVENTING FOREIGN PARTICLES

CROSS-REFERENCE TO RELATED APPLICATION

This application is based upon and claims benefit of priority of Japanese Patent Application No. 2007-206012 filed on Aug. 8, 2007, the content of which is incorporated herein by reference.

BACKGROUND OF THE INVENTION

1. Field of the Invention

The present invention relates to an alternator (an AC-generator) to be mounted on an automotive vehicle.

2. Description of Related Art

An alternator having a structure for preventing foreign particles from entering into a bearing portion has been known hitherto. An example of a conventional structure for preventing foreign particles is shown in FIG. 5 attached hereto. In the structure shown in FIG. 5, a cooling fan 110 connected to a rear side of a rotor includes an annular portion 112 bent from the cooling fan in the axial direction. A rear side bearing 114 supporting the rotor is held by a bearing holder 118 that extends in the axial direction. The annular portion 112 overlaps with the bearing holder 118 in the axial direction while making a small gap therebetween in the radial direction, so that a labyrinth is made between the annular portion 112 and the bearing holder 118. Thus, foreign particles contained in cooling air are prevented from entering into the bearing 114.

Another example of the structure for preventing foreign particles is disclosed in JP-A-2005-151728. A relevant portion of the structure is shown in FIG. 6 attached hereto. An inner ring of a bearing 120 rotates together with a rotor shaft 130. A pair of shield plates 122, 124, each having an L-shaped cross-section, are connected to the rotor shaft 130 so that they rotate together with the inner ring of the bearing 120. Foreign particles entered to the vicinity of the bearing 120 are blown away in the radial direction by a centrifugal force of the shield plates 122, 124.

In the conventional structure shown in FIG. 5, a length of the annular portion 112 in the axial direction has to be made longer to further improve its ability for preventing foreign particles from entering the bearing portion. However, a foot portion 119 becomes thinner by making the axial length of the annular portion 112 longer. A mechanical strength of the foot portion 119 may not be strong enough to endure repetition of changes in rotational speed of the rotor. In the conventional structure shown in FIG. 6, the shield plates have to be additionally prepared and connected to the rotor shaft 130. This makes a manufacturing cost of the alternator higher.

SUMMARY OF THE INVENTION

The present invention has been made in view of the above-mentioned problems, and an object of the present invention is to provide an improved alternator having a structure for preventing foreign particles while providing a high durability and suppressing a manufacturing cost.

The alternator according to the present invention is mounted on an automotive vehicle. The alternator includes a housing, a stator fixedly held in the housing, a rotor rotatably supported by the housing in an inner space of the stator, and other associated components including a brush device, a voltage regulator and a rectifier. The rotor supplying a magnetic field is driven by an automotive engine, and alternating current is generated in the stator. The alternating current generated in the stator is rectified into direct current by the rectifier and supplied to an on-board battery and electric loads.

A cooling fan is connected to an axial end surface of the rotor to introduce cooling air from the axial end of the housing and to blow out the cooling air from the housing in its radial direction. The cooling fan includes an annular portion formed by bending a base plate of the cooling fan. The annular portion extends in the axial direction and overlaps a bearing holder formed in the housing. An inner diameter of the annular portion is made larger than an outer diameter of the bearing holder, thereby forming a small annular gap between the bearing holder and the annular portion.

Projected portions extending in the outer radial direction from the annular portion are formed integrally with the annular portion. Each projected portion may be formed by making a slit in the annular portion and bending a side of the slit in the outer radial direction. An outer most diameter of the projected portions is preferably positioned close to the axial end of the annular portion. Alternatively, each projected portion may be made by swelling part of the annular portion.

Foreign particles included in the cooling air are effectively prevented from entering into the bearing by the annular portion and the bearing holder. In other words, the small gap made between the annular portion and the bearing holder functions as a labyrinth for preventing the foreign particles. The projections projected outwardly from the annular portion functions as a sub-fan for blowing out the foreign particles. Since the annular portion having the projected portions is formed on the cooling fan without adding parts or components, a manufacturing cost of the alternator is kept low.

Other objects and features of the present invention will become more readily apparent from a better understanding of the preferred embodiment described below with reference to the following drawings.

DETAILED DESCRIPTION OF THE PREFERRED EMBODIMENT

Figure 1:
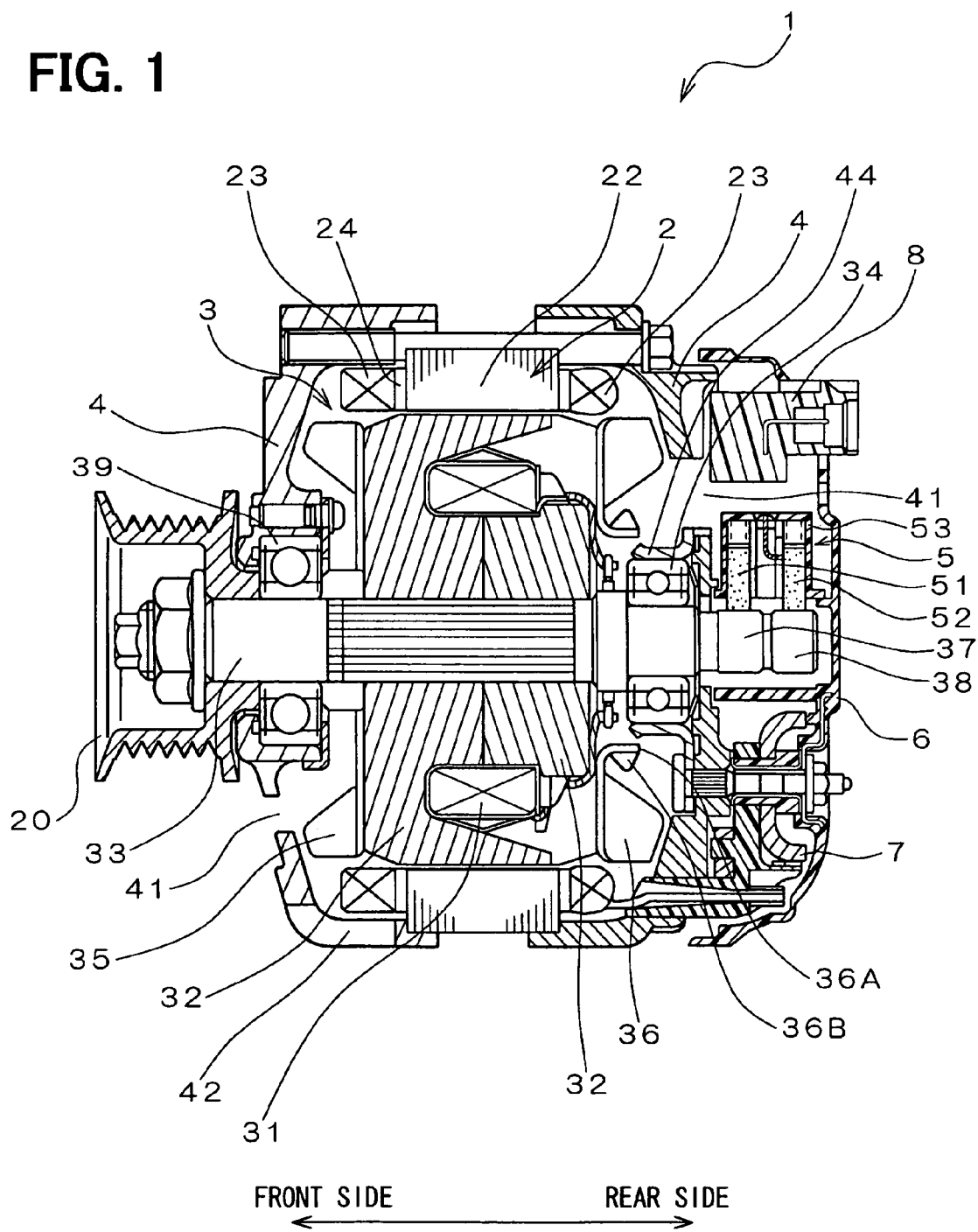
FIG. 1 is a cross-sectional view showing an alternator according to the present invention.

A preferred embodiment of the present invention will be described with reference to FIGS. 1-4. As shown in FIG. 1, an alternator 1 is composed of a housing including front and rear frames 4, a stator 2 held in the housing, a rotor 3 rotatably supported by the housing in the stator, a brush device 5, a rear cover 6 and associated components. The stator 2 includes a stator core 22, three-phase windings 23 disposed in slots formed in the stator core, and insulators 24 for electrically insulating the windings 23 from the stator core 22.

Figure 2:
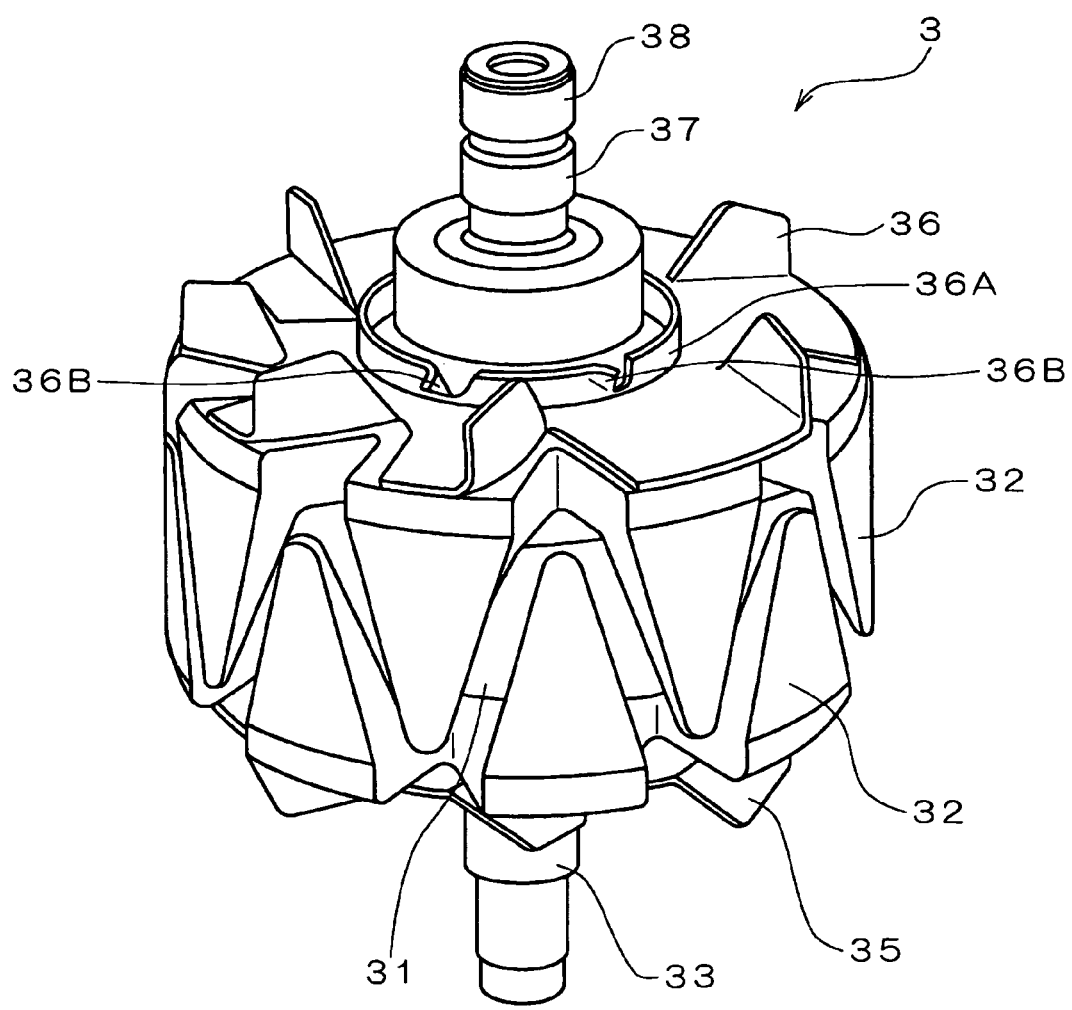
FIG. 2 is a perspective view showing a rotor used in the alternator.
Figure 3:
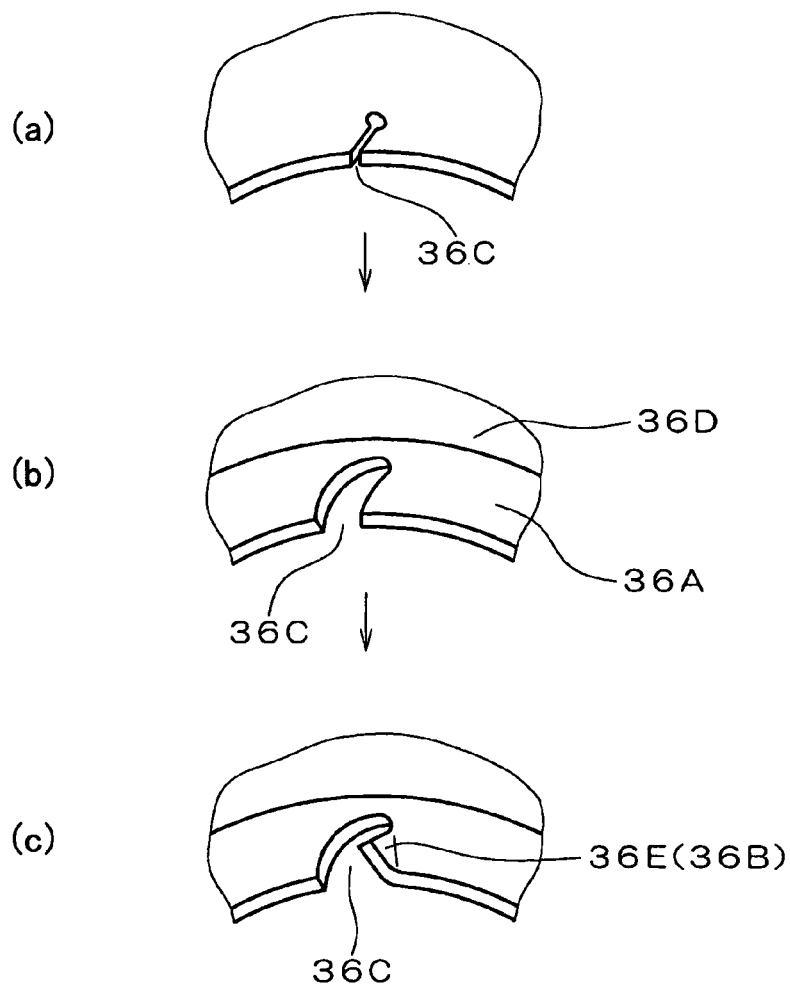
FIGS. 3(a), 3(b) and 3(c) are fragmental perspective views showing a process of forming projections on an annular portion of a cooling fan.

The rotor 3 includes a pair of pole cores 32 consisting of a front pole core and a rear pole core, a rotor winding 31 wound around the pole cores, and a rotor shaft 33 fixedly connected to a center hole of the pole cores 32. The rotor winding 31 is formed by winding an insulated wire around a center boss of the pole cores 32. The pole cores 32, each having six claws, are coupled as shown in FIG. 2. A front cooling fan 35 is connected to a front surface of the front side pole core 32 by welding or the like. Cooling air sucked by the front cooling fan 35 into the alternator 1 in the axial direction through windows 41 is blown out in the radial direction from windows 42. Similarly, a rear cooling fan 36 is connected to a rear surface of the rear side pole core 32 by welding or the like. Cooling air sucked by the rear cooling fan 36 into the alternator 1 in the axial direction through windows 41 is blown out in the radial direction.

Slip-rings 37, 38 are connected to a rear end portion of the rotor shaft 33. Both ends of the rotor winding 31 are connected to the slip-rings 37, 38. Excitation current is supplied to the rotor winding 31 from the slip-rings, which slidably contact brushes 51, 52 of the brush device 5. The brushes 51, 52 are held in a brush holder 53. The stator 2 is fixedly held between the pair of frames 4, and the rotor shaft 33 is rotatably supported by a front bearing 39 held in the front side frame and a rear bearing 34 held in the rear side frame. A certain air gap is provided between the stator 2 and the rotor 3. A rectifier 7 for rectifying alternating current generated in the stator windings 23 into direct current, an IC regulator for controlling an output voltage to a desired level, and the brush device 5 are mounted on the rear side frame 4 and covered with a rear cover 6 that protects the components mounted on the rear side frame 4 from foreign particles.

A pulley 20 which is driven by an engine through a belt is connected to the rotor shaft 33. The pole cores 32 of the rotor 3 generate a magnetic field by supplying excitation current thereto. Three-phase alternating current is generated in the stator windings 23 according to rotation of the rotor 3. The three-phase alternating current is rectified into direct current by the rectifier 7, and the direct current is taken out from the alternator through an output terminal (not shown).

Now, the rear side cooling fan 36 will be described in detail. The rear side cooling fan 36 has an annular portion 36A which extends in the axial direction from a base plate of the rear side cooling fan 36. The annular portion 36A overlaps with a bearing holder 44 holding the rear bearing 34 in the axial direction, as shown in FIG. 1. An inner diameter of the annular portion 36A is larger than an outer diameter of the bearing holder 44, and a small gap is formed in the radial direction between the annular portion 36A and the bearing holder 44. Projected portions 36B projected in the radial direction are formed integrally with the annular portion 36A.

A method of manufacturing the annular portion 36A having projected portions 36B will be described with reference to FIG. 3(a)-(c). As shown in FIG. 3(a), slits 36C for forming the projected portions 36B are formed on the base plate of the cooling fan 36. The slits 36C may be formed by stamping or machining. Then, as shown in FIG. 3(b), the annular portion 36B is formed by bending the base plate along a boundary 36D so that the annular portion 36B stands from the base plate at a right angle. This process may be performed by using a drawing die. Then, as shown in FIG. 3(c), the projected portions 36B are bent and raised from the annular portion 36A, thereby forming plural projected portions functioning as a sub-fan 36E. The projected portions 36B are formed at an axial end of the annular portion 36A. This process may be performed by inserting a jig into an inner diameter of the annular portion 36A. The cooling fan 36 having the projected portions 36B made in the above-described process is connected to the rear side surface of the rotor 3, as shown in FIG. 2.

Figure 4:
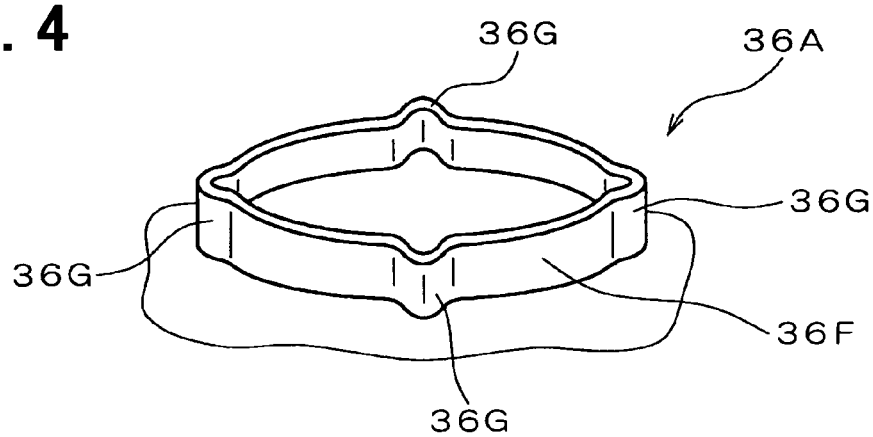
FIG. 4 is a perspective view showing swollen portions formed on a cylindrical surface of an annular portion.
Figure 5:
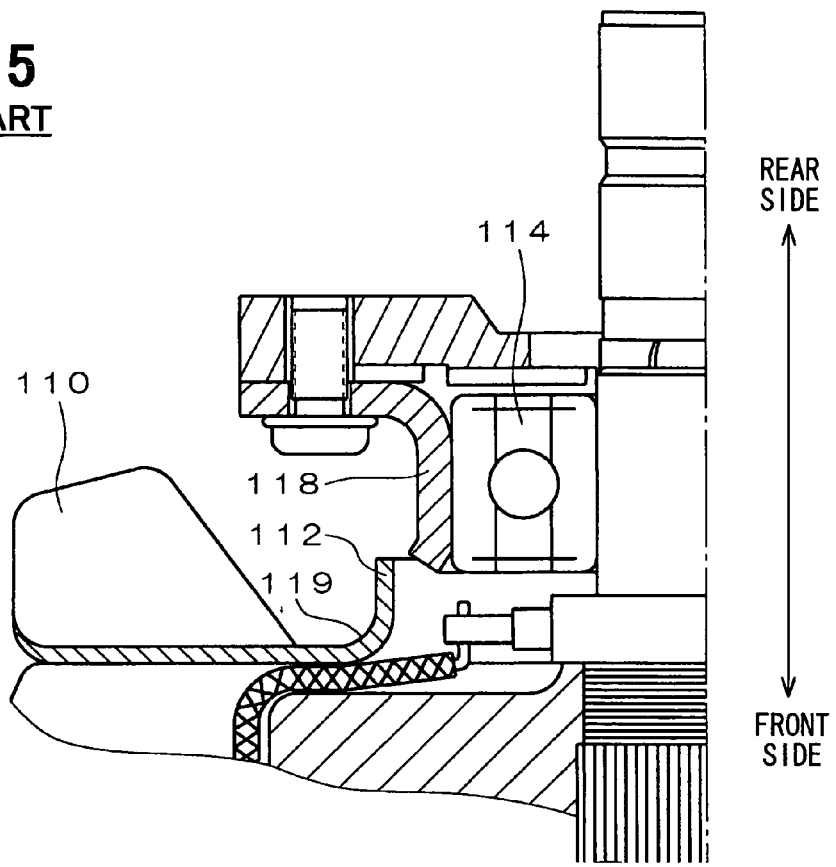
FIG. 5 is a partial cross-sectional view showing a conventional structure for preventing foreign particles.
Figure 6:
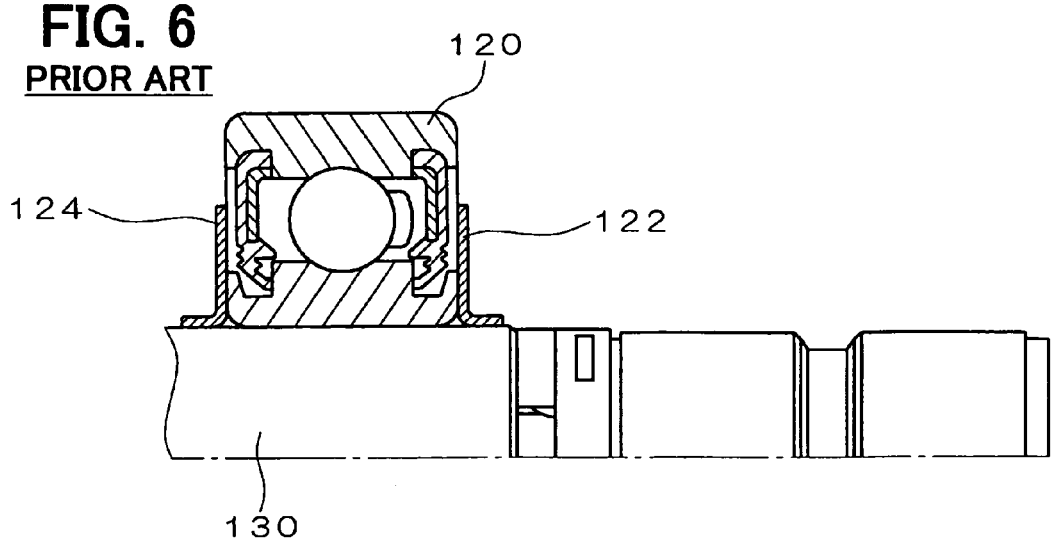
FIG. 6 is a partial cross-sectional view showing another conventional structure for preventing foreign particles.

The projected portions 36B may be replaced with swollen portion 36G formed on the annular portion 36A. As shown in FIG. 4, the swollen portions 36G are formed by pushing the annular portion 36A outwardly so that a cylindrical surface 36F is projected outside. This operation forming the swollen portions 36G may be performed at the same time as the annular portion 36A is formed by drawing the base plate of the cooling fan 36. The swollen portions 36G function as a centrifugal sub-fan.

Since the projected portions 36B (or the swollen portions 36G) are formed on the annular portion 36A without making its height longer in the axial direction, the mechanical strength of the annular portion is not decreased. The projected portions 36B (or swollen portions 36G) well function as a structure for preventing foreign particles from entering into the rear bearing 34. The projections 36B (swollen portions 36G) are formed by deforming part of the annular portion 36A without adding any additional components or parts. Therefore, the alternator 1 can be made cost-effectively. Since the outermost diameter of the projected portions 36B is positioned at an axial end of the annular portion 36A, foreign particles are effectively prevented from entering into the bearing portion.

The present invention is not limited to the embodiment described above, but it may be variously modified. For example, though the cooling fan 36 is made of a metallic material by press-work in the embodiment described above, it may be made of a resin material by molding or aluminum by die-casting. While the present invention has been shown and described with reference to the foregoing preferred embodiment, it will be apparent to those skilled in the art that changes in form and detail may be made therein without departing from the scope of the invention as defined in the appended claims.

What is claimed is:

1. An automotive alternator comprising:
 a housing;
 a stator held in the housing;
 a rotor rotatably supported by the housing in an inner space of the stator; and
 a rear cooling fan rotating together with the rotor, the rear cooling fan having an annular portion, wherein:
 the annular portion has a diameter larger than that of a bearing holder holding a bearing supporting the rotor, the annular portion extending in an axial direction of the rotor to overlap the bearing holder, thereby forming an annular gap between the bearing holder and the annular portion; and
 the annular portion includes projected portions projected in an outside radial direction from the annular portion, the projected portions being formed integrally with the annular portion.

2. The automotive alternator as in claim 1, wherein the annular portion includes a plurality of slits with a side of each slit bent forming the projected portions.

3. The automotive alternator as in claim 1, wherein the annular portion has a plurality of bends projecting outwardly in the radial direction to define the projected portions, and the annular portion extends continuously in the circumferential direction.

4. The automotive alternator as in claim 1, wherein an outermost diameter of the projected portions is positioned close to an axial end of the annular portion.

5. The automotive alternator as in claim 1, wherein the rear cooling fan is connected to a rear side surface of the rotor, and cooling air is introduced into the housing from its axial rear side and blown out from the housing in its radial direction.

* * * * *